Aug. 29, 1933.  A. C. GRANT  1,924,925
FURNACE CONTROL MEANS
Filed Feb. 8, 1932
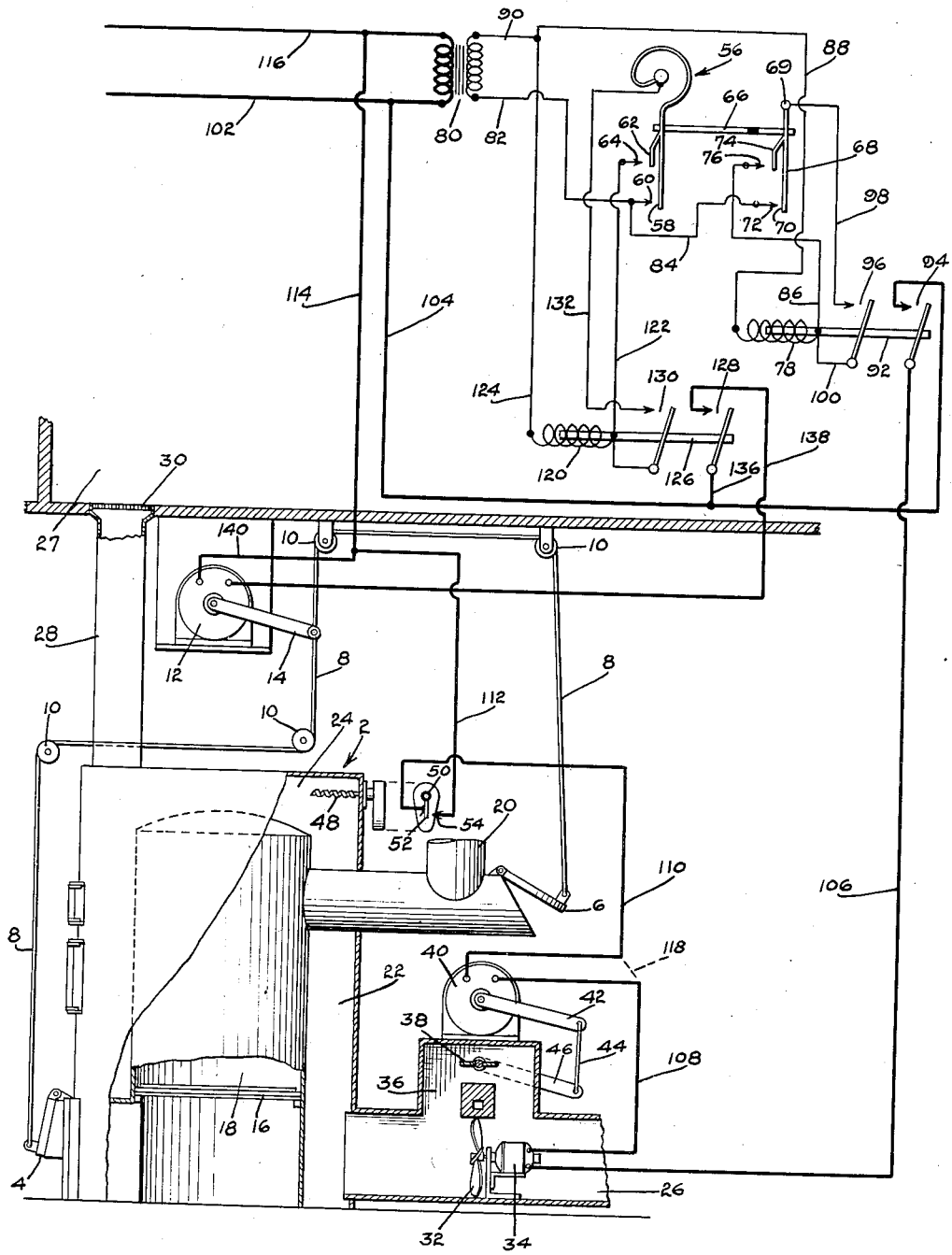
INVENTOR
ARTHUR C. GRANT
By Paul, Paul Moore
ATTORNEYS Patented Aug. 29, 1933

1,924,925

UNITED STATES PATENT OFFICE 1,924,925

FURNACE CONTROL MEANS

Arthur C. Grant, St. Paul, Minn., assignor to Minneapolis-Honeywell Regulator Company, Minneapolis, Minn., a corporation of Delaware Application February 8, 1932. Serial No. 591,648

11 Claims. (Cl. 236—11)

This invention relates to a method of and apparatus for controlling furnaces. More particularly the invention concerns itself with furnaces of the type which are provided with electrically actuated auxiliary means for circulating therefrom a heat transfer medium to a room or space being heated.

In the case of hot air furnaces of this type, a motor or other actuating means for the circulating means is intended to be set in operation when the temperature of the room or space being heated falls, thereby to send a flow of air through the furnace to the room and raise its temperature. If the furnace is not at a sufficiently high temperature to raise that of the circulating air above the room temperature, however, the operation of the motor for the circulating means will not serve to raise the room temperature. On the contrary, if the furnace is cold, the circulating means may operate to send a relatively cold current of air into the room intended to be heated. It is accordingly essential that the furnace be controlled in a manner to provide the necessary heat when air is to be circulated and it is also desirable to refrain from circulating air when the furnace is at a temperature below a predetermined minimum. It will further be apparent that the amount of heat generated by the furnace should be reduced when no air is to be circulated or when only a small amount of air is to be circulated, if efficient operation is to be had.

Hot air furnaces are ordinarily provided with a pair of controls for regulating the generation of heat. These heat controls comprise a draft damper and a check damper and they are usually so connected that the draft damper is open when the check damper is closed and the check damper is open when the draft damper is closed. When the draft damper is closed and the check damper is open, the fuel in the furnace is receiving a minimum amount of air for combustion and the furnace is therefore generating a minimum amount of heat but when the check damper is closed and the draft damper is open, a maximum amount of air passes in contact with the fuel to enable maximum combustion and consequently maximum generation of heat.

It is known that there is a time lag between the opening of the damper and the maximum generation of heat. That is, the furnace will not begin to generate heat at its maximum capacity the instant the draft damper is open but some time will be required before the desired high rate of combustion will take place. So also there is a time interval between the closing of the damper and the time when the furnace will begin to generate heat at its minimum rate. In the case of a damper controlled furnace of this type which is provided with means for circulating air therethrough and to the room being heated, it is desirable that the circulating means be operated for a time after the damper has been closed in order that the circulating air may receive and carry away the heat generated in the furnace during the time interval between the closing of the damper and the assumption of minimum heat generation by the furnace.

It is accordingly a general object of this invention to provide control means responsive to the temperature of the room or space being heated for closing the draft damper of the furnace when the room reaches a temperature somewhat lower than that at which it is desired to cease delivering heat thereto, and for continuing the operation of the auxiliary circulating means until the desired temperature is reached. In this way the heat generated by the furnace both during the period when its damper was open and during the time interval between the closing of the damper and the arising of a condition within the furnace under which it generates heat at a minimum rate, is economically utilized. If the auxiliary circulating means is rendered inoperative at the same time the damper is closed, a continued generation of heat in the furnace at a high rate will result which heat may be dissipated in the furnace room. This is commonly called "over-shooting". It is another general object of this invention to provide a simplified control means which will result in elimination of "over-shooting" and in more efficient operation of the system.

A certain amount of heat is generated in the furnace even though the draft damper is closed and a great portion of this heat becomes stored in the furnace heating surfaces and in the air space of the furnace which is relatively stagnant when the circulating motor is not in operation. If the temperature of the room being heated falls a slight amount after a prolonged period of operation of the furnace with the draft damper closed, it is possible that there will be sufficient heat stored up in the furnace to raise the room temperature to the desired point. By passing a circulating medium from the furnace to the room, the stored heat in the furnace may be transferred to the room with the result that the room may be raised to the desired temperature without the necessity of operating the draft damper to accelerate the generation of heat in the furnace. It is therefore a further object of the invention to provide means responsive to the temperature of the room or space being heated for setting the air circulating means in operation upon a specified temperature fall and then rendering them inoperative without having opened the control damper, provided the amount of heat stored up in the furnace as a result of continued operation with the draft damper closed was sufficient to bring the room to desired temperature.

It is a further object of the invention to provide means in a control system of the character described above for preventing operation of the circulating means when the temperature within the air space of the furnace is at a predetermined minimum.

The various objects of the invention will become more readily apparent upon a detailed study of the specification and accompanying drawing together with the appended claims.

The drawing, which is illustrative of the invention, is a diagrammatic showing of a hot air furnace provided with control means in accordance with this invention.

Referring to the drawing, 2 designates a hot air furnace having a draft damper 4 and a check damper 6. The dampers are each connected to a chain or cable 8 operating on the pulleys 10 and the arrangement is such that the check damper 6 will remain open when the draft damper 4 is closed. When the cable is moved to pull draft damper 4 open, the check damper will close under the influence of gravity. A motor 12 has a shaft provided with an arm 14 connected to the cable 8 and moves in counter-clockwise direction from the position shown in the drawing when energized. As the arm 14 moves upwardly it will be seen that draft damper 4 will be drawn upwardly and check damper 6 will be closed. The motor 12 stalls when the draft damper reaches its uppermost position holding this damper open and keeping the check damper closed as long as it is energized. When the motor is de-energized, the draft damper will close by gravity and at the same time pull arm 14 back to the position shown in the drawing and open the check damper.

When the draft damper is open and the check damper is closed, air will be drawn into the furnace below the grate 16 and will pass through combustion chamber 18 to the stack 20. As a consequence the fuel on the grate will receive a relatively great amount of air for combustion and a relatively great amount of heat will be generated in the furnace. When the draft damper is closed and the check damper is open, the fuel will receive a smaller amount of air with the result that a relatively smaller amount of heat will be generated.

The circulating air space of the furnace is generally designated at 22 and is provided with an enlarged space 24 at the top. A conduit 26 communicates with the circulating air space of the furnace and is adapted to receive air which is to be heated in the furnace and sent to the room or space 27 being heated, through the conduit 28 and the register or the like 30. The air entering conduit 26 may be entirely fresh air or air which has previously circulated through room 27. Conduit 26 is provided with a fan 32 driven by the motor 34. When the motor 34 is in operation the fan acts to draw the circulating air through conduit 26 and force it into the air space 22 of the furnace from which it passes to the room or space being heated.

When the fan is not being driven by the motor 34 there is nevertheless some natural passage of the circulating air through the furnace and if the fan is of such a type as to block the conduit 26 when not in operation, a by-pass 36 around the fan is provided. This by-pass is controlled by means of a by-pass damper 38 which is held in closed position when the fan motor is in operation and which is moved into open position when the fan is not in operation. In this way, the natural circulation of the system may take place even when the fan is inoperative. A motor 40 having an arm 42 fixed to its shaft controls the by-pass damper 38 by means of a link 44 connected to an arm 46 which is fixed to the shaft on which the damper is also fixed. When motor 40 is energized the arm 42 will be raised whereupon arm 46 will also be raised and the damper 38 moved into closed position which will be held due to stalling of the motor. Upon de-energization of the motor 40, the parts will drop back into the position shown in the drawing.

The enlarged air space 24 of the furnace contains a thermally responsive coil 48 which rotates a shaft 50 as its temperature changes. The shaft 50 controls a pair of contacts 52 and 54, the arrangement being such that these contacts are closed when the coil 48 is at or above a previously selected temperature and are opened when the coil 48 falls below this temperature.

The motors 12, 34, and 40, are controlled by means of a control member situated in the room 27. In the drawing, the control member is shown as constituting a thermostat comprising a bi-metallic element generally designated at 56 which carries a contact 58 for engagement with a stationary contact 60, and a contact 62 for engagement with a stationary contact 64. The link 66 is connected to the bi-metallic element 56 at one end and to a conductor 68 at its other end, this conductor being movable about its pivot 69. Conductor 68 carries a contact 70 for engagement with the stationary contact 72, and a contact 74 for engagement with the stationary contact 76. Link 66 is insulated from both the thermostat 56 and the pivoted conductor 68.

When the room 27 is at desired temperature, the thermostatic element 56 and the pivoted conductor 68 are in the positions shown in the drawing in which none of the contacts they control are closed. When the temperature of room 27 falls, bi-metallic element 56 will move to the left thereby drawing pivoted conductor 68 to the left until contacts 70 and 72 come into engagement. If it is assumed that the temperature continues to fall, the element 56 will continue to move to the left until a position is reached in which contact pairs 58 and 60, and 74 and 76 will both be brought into engagement. Upon continued temperature drop, element 56 will be moved to the left until contacts 62 and 64 come into engagement, the remaining contact pairs remaining in engagement. If the temperature then rises, bi-metallic element 56 will move to the right and the various contact pairs will disengage in the reverse order from that in which they engaged during the temperature fall.

If it be assumed that the thermostatic coil within the furnace is at a sufficiently high temperature to hold contacts 52 and 54 in engagement, and that the desired room temperature exists, contact pairs 62 and 64, 58 and 60, 70 and 72, and 74 and 76 will be open, motors 12, 34 and 40 will be de-energized, draft damper 4 will be closed, check damper 6 will be open, and by-pass damper 38 will be open. The furnace will therefore generate a minimum amount of heat and a minimum amount of heat will be supplied to the room 27 under conditions of natural circulation. If the temperature of room 27 then falls as a result of this small supply of heat, bi-metallic element 56 will move to the left until contacts 70 and 72 come into engagement but no circuit will be closed by the engagement of these contacts and bi-metallic element 56 will continue to move to the left under the influence of continued temperature fall until the point is reached at which contact pairs 58 and 60, and 74 and 76 are brought into engagement. Engagement of contacts 58 and 60 does not close any circuit.

Upon the closing of contacts 74 and 76, the following circuit to initially energize the relay coil 78 will be set up through the secondary of the transformer 80: secondary of transformer 80, wire 82, wire 84, contact 72, contact 70, pivoted conductor 68, contact 74, contact 76, wire 86, relay coil 78, wire 88, wire 90, and secondary of transformer 80.

Upon the energization of relay coil 78, its armature 92 will be drawn to the left thereby to close the switches 94 and 96. The closing of switch 96 will set up the following holding circuit for coil 78: secondary of relay 80, wire 82, wire 84, contact 72, contact 70, pivoted conductor 68, wire 98, switch 96, wire 100, relay coil 78, wire 88, wire 90, and secondary of transformer 80.

The closing of switch 94 closes the following circuit for the fan motor 34 and the by-pass damper control motor 40: side of line 102, wire 104, switch 94, wire 106, fan motor 34, wire 108, by-pass damper control motor 40, wire 110, contact 52, contact 54, wire 112, wire 114 and side of line 116. Energization of motor 40 closes damper as outlined above. If the fan 32 is of such a nature as to permit of passage of the circulating air through conduit 26 even when the motor is not in operation, the by-pass assembly may be dispensed with and wires 108 and 110 may be connected as shown by the dotted line 118.

When the motor 34 becomes energized it will operate fan 32 to force air through the furnace as previously explained and in the event there is a sufficient amount of heat already stored up in the furnace to raise the temperature of room 27 the desired amount, bi-metallic element 56 will move to the right causing contact pairs 58 and 60, 66 and 74, and 70 and 72 to disengage without allowing contacts 62 and 64 to come into engagement. Upon such movement to the right, relay coil 78 remains energized through its holding circuit even after separation of contacts 74 and 76 but when the thermostat is moved sufficiently to cause contacts 70 and 72 to disengage, the holding circuit for relay coil 78 will be broken and armature 92 will move to the right thereby opening switches 96 and 94. The opening of switch 94 will break the energizing circuit for fan motor 34 and this motor will then remain idle until the temperature in room 27 drops a sufficient amount to cause the thermostat to move to the left until contacts 74 and 76 again engage. Damper control motor 40 will also be de-energized and the damper 38 will move to open position.

If it now be assumed that the thermostat is in such position that contact pairs 58 and 60, 70 and 72, and 74 and 76 are in engagement and the motor 34 is operating but that the temperature in room 27 continues to drop, bi-metallic element 56 will continue to move to the left until contacts 62 and 64 come into engagement. When these contacts engage the following circuit for initially energizing relay coil 120 is set up: secondary of transformer 80, wire 82, contact 60, contact 58, bi-metallic element 56, contact 62, contact 64, wire 122, relay coil 120, wire 124, wire 90 and secondary of transformer 80. As coil 120 is energized, its armature 126 will be moved to the left thereby closing switches 128 and 130. The closing of switch 130 sets up the following holding circuit for coil 120 through contacts 58 and 60: secondary of relay 80, wire 82, contact 60, contact 58, bimetallic element 56, wire 132, switch 130, wire 134, relay coil 120, wire 124, wire 90, and secondary of relay 80.

The closing of switch 128 sets up the following energizing circuit for the damper control motor 12: side of line 102, wire 104, wire 136, switch 128, wire 138, damper control motor 12, wire 140, wire 114, and side of line 116. Motor 12 will then open draft damper 4 and stall to hold it open as previously explained.

When contacts 62 and 64 are in engagement, and contacts 52 and 54 are also in engagement, the fan motor 34 is thus operating and the draft damper 4 is open to allow maximum combustion of the fuel in the furnace. If the temperature of room 27 rises under such conditions the bi-metallic element 56 will begin to move to the right thereby separating contacts 62 and 64 but the relay coil 120 will remain energized through its holding circuit and the draft damper will accordingly remain open in spite of the separation of these contacts. Upon continued movement of the bi-metallic element 56 to the right until contacts 58 and 60 separate, however, the holding circuit for relay coil 120 will be broken and armature 126 will move to the right thereby to open switches 128 and 130, whereupon motor 12 will be de-energized, and damper 4 will accordingly close. Upon continued room temperature rise and continued movement of the bi-metallic element 56 to the right until contacts 70 and 72 separate, the fan motor 34 will be de-energized as previously explained.

The purpose of the thermostatic coil 48 controlling the contacts 52 and 54 in the energizing circuit of the fan motor 34 is to prevent the operation of the fan motor when the air space within the furnace is at such a low temperature as to make it undesirable to effect a circulation therethrough. For example, the coil may be so adjusted that the contacts 52 and 54 will be closed when the temperature within the air space in the furnace is at 130 degrees F. or above and will be opened when the furnace temperature is lower. When the contacts 52 and 54 are separated the energizing circuit for fan motor 34 will of course be broken and this motor will not operate even though its contacts controlled by the room thermostat 56 are closed.

If the furnace is relatively cold so that its air space has a temperature of 100 degrees F., and the temperature of the room 27 falls to a point at which contacts 74 and 76 engage, the motor 34 will nevertheless not be energized since contacts 52 and 54 will be separated. As the room temperature continues to fall until contacts 62 and 64 come into engagement, the motor 12 will be energized and the draft damper 4 opened. The opening of this damper should raise the temperature of the furnace and as soon as the air space 24 reaches a temperature of 130 degrees, the contacts 52 and 54 will close and set the fan 34 in operation. The parts will then operate as before until the room has reached a sufficiently high temperature to move the thermostat to the right until contacts 70 and 72 have become separated.

It will be observed that when the room is at desired temperature the motors are all de-energized, the draft damper is closed and the check damper is open as shown in the drawing. As the temperature begins to fall the fan motor 34 is energized, provided the furnace is at a sufficiently high temperature to warrant circulation of air. Should there be sufficient heat stored in the furnace to check the room temperature drop and raise it to the desired point, the fan motor will be de-energized when this point is reached. If, however, the temperature of the room 27 continues to drop after the fan motor is placed in operation, the draft damper 4 will be opened and the check damper will be closed, the motor 34 meanwhile remaining in operation. After the temperature of the room then rises the draft damper is first closed and at a higher temperature the fan motor is de-energized. The heat generated in the furnace at relatively high rate after the damper is closed is thus taken up by the air being circulated by fan 32 and sent to the room 27. This operation eliminates "overshooting" and the dissipation of an undue amount of heat in the furnace room to effect a saving in fuel. Also, the system enables closer temperature regulation.

In the event the furnace is at a temperature too low to warrant the circulation of air therethrough when the room temperature drops to a point at which it would be desirable to start circulating air by means of the fan, if the furnace were hot, the thermostatic coil 48 in the furnace will act to keep the fan motor circuit open. As the room temperature continues to drop the draft damper is opened and the fan will only be placed in operation when the furnace reaches a sufficiently high temperature to warrant air circulation.

It will of course be understood that the draft damper control may be substituted by any desired control for accelerating and retarding the generation of heat by the furnace.

I claim as my invention:

1. The combination with a hot air furnace having a draft damper, a fan for passing circulating air in contact with the furnace heating surfaces, an electric motor for driving said fan, and an energizing circuit for said motor, of a control member movable in response to temperature variations in the room or space being heated by said furnace, means associated with said control member for closing the energizing circuit of said motor upon a predetermined fall in room temperature, means associated with the control member for opening said draft damper upon a further fall in room temperature, and means associated with the control member for closing said draft damper and opening the motor energizing circuit after a rise in room temperature.

2. The combination with a hot air furnace having a draft damper, a fan for passing circulating air in contact with the furnace heating surfaces, a motor for driving said fan, and an energizing circuit for the motor, of a control member movable in response to changes in the temperature of the room or space being heated by the furnace, means associated with the control member for closing the motor energizing circuit at a first temperature, means associated with the control member for opening said draft damper at a second temperature lower than the first, means associated with the control member for closing said damper at a third temperature higher than the second, and means associated with the control member for opening the energizing circuit of the motor at a fourth temperature higher than the third temperature.

3. The combination with a hot air furnace having a control damper, of a conduit for passing circulating air to the furnace heating surfaces, a fan in said conduit, an electric motor for driving said fan, a by-pass communicating with said conduit at points on either side of said fan, a damper for opening and closing said by-pass, a central control member movable in response to changes in the temperature of the room or space being heated, means associated with said control member for automatically energizing the fan motor, closing the by-pass damper, and opening the draft damper upon a fall in room temperature, means associated with the control member for closing said draft damper upon a resultant rise in the room temperature, and means associated with the control member for de-energizing said motor and opening the by-pass damper upon an additional rise in room temperature.

4. The combination with a hot air furnace having electrically operated means for passing circulating air in contact with the furnace heating surfaces, a draft damper, and a check damper, of a connection between said dampers for holding one open when the other is closed, a damper control motor communicating with said connection and operable when energized to hold the control damper in open position and the draft damper in closed position, said draft damper being adapted to close and hold the check damper open when the motor is de-energized, a control member movable in response to changes in the temperature of the room or space being heated, means associated with the control member for energizing the fan motor and energizing the damper control motor upon a fall in room temperature, means associated with the control member for de-energizing the damper control member upon a resultant rise in room temperature, and means associated with the control member for de-energizing the fan motor upon an additional rise in room temperature.

5. The combination with a hot air furnace having electrically operated means for passing circulating air in contact with the furnace heating surfaces, a draft damper, and a check damper, of a connection between said dampers for holding one open when the other is closed, a damper control motor communicating with said connection and operable when energized to hold the control damper in open position and the draft damper in closed position, said draft damper being adapted to close and hold the check damper open when the motor is de-energized, a control member movable in response to changes in the temperature of the room or space being heated, means associated with said control member for energizing the fan motor at a first room temperature, means associated with the control member for energizing the motor control damper at a second room temperature lower than the first, means associated with the control member for de-energizing the damper control motor at a third room temperature higher than the second, and means associated with the control member for de-energizing the fan motor at a fourth room temperature higher than the first, second and third room temperatures.

6. The combination with a hot air furnace having a draft damper, and electric motor operated means for passing circulating air in contact with the furnace heating surfaces, of an energizing circuit for said motor, a thermally responsive element in the circulating air space of the furnace, a first pair of contacts in the motor energizing circuit adapted to be opened and closed by said thermally responsive element, a second pair of contacts in said motor energizing circuit, a control member movable in response to variations in the temperature of the room or space being heated by the furnace, means associated with the control member for closing said second pair of contacts and for opening said draft damper upon a fall in the room temperature, means associated with the control member for closing the draft damper upon a rise in room temperature above said fall, and means associated with the control member for opening said second pair of contacts upon an additional rise in the room temperature.

7. The combination with a hot air furnace having a fan for passing circulating air in contact with the furnace heating surfaces, an electric motor for driving said fan, an energizing circuit for said fan motor, a draft damper, a check damper, and means connecting said dampers for holding one open while the other is closed and vice versa, of a damper control motor communicating with said connecting means and operable when energized to hold the draft damper open, said draft damper being adapted to close and hold the check damper open when the motor is deenergized, a thermally responsive element in the circulating air space of the furnace, a first pair of contacts in the fan motor energizing circuit adapted to be opened and closed by said thermally responsive element upon movement of said element due to changes in the temperature of the circulating air within the furnace, a second pair of contacts in said fan motor energizing circuit, a control member movable in response to changes in the temperature of the room or space being heated, means associated with the control member for closing the second pair of contacts in the fan motor energizing circuit at a first temperature, means associated with the control member for energizing the damper control motor at a second temperature lower than the first, means associated with the control member for de-energizing the damper control motor at the first said temperature, and means associated with the control member for separating the second pair of contacts in the fan motor energizing circuit at a third temperature higher than the first.

8. The combination with a hot air furnace, means for increasing the generation of heat therein, a fan for passing circulating air in contact with the furnace heating surfaces, an electric motor for driving said fan, and an energizing circuit for said motor, of a control member movable in response to temperature variations in the space to be heated by said furnace, means associated with said control member for closing the energizing circuit of said motor upon a predetermined fall in the space temperature, means associated with the control member for operating said means for increasing the generation of heat in the furnace upon a further fall in the space temperature, and means associated with the control member for terminating operation of the means for increasing the generation of heat in the furnace and opening the motor energizing circuit after a rise in room temperature.

9. The combination with a hot air furnace, means for increasing the generation of heat therein, a fan for passing circulating air in contact with the furnace heating surfaces, an electric motor for driving said fan, and an energizing circuit for said motor, of a control member movable in response to temperature variations in the space to be heated by said furnace, means associated with the control member for operating said means for increasing the generation of heat in the furnace and closing the motor energizing circuit upon a fall in the space temperature, means associated with the control member for terminating operation of the means for increasing the generation of heat in the furnace upon a predetermined rise in the space temperature, and means associated with the control member for opening the motor energizing circuit upon a further rise in the space temperature.

10. The combination with a hot air furnace, of electrically operated means for controlling the generation of heat by the furnace, said means being operative to cause the furnace to generate a relatively great amount of heat when energized and to cause the furnace to generate a relatively smaller amount of heat upon deenergization thereof, a fan for passing circulating air in contact with the furnace heating surfaces, an electric motor for energizing said fan, an energizing circuit for said motor, a control member movable in response to temperature variations in the space to be heated by the furnace, means associated with the control member for closing the energizing circuit of said motor upon a predetermined fall in the space temperature, means associated with the control member for energizing said electrically operated means upon a further fall in the space temperature, and means associated with the control member for deenergizing said electrically operated means and opening the energizing circuit of said motor after a rise in the space temperature.

11. The combination with a hot air furnace, of electrically operated means for controlling the generation of heat by the furnace, said means being operative to cause the furnace to generate a relatively great amount of heat when energized and to cause the furnace to generate a relatively smaller amount of heat upon deenergization thereof, a fan for passing circulating air in contact with the furnace heating surfaces, an electric motor for energizing said fan, an energizing circuit for said motor, a control member movable in response to temperature variations in the space to be heated by the furnace, means associated with the control member for closing the energizing circuit of said motor and energizing said electrically operated means upon a fall in the space temperature, means associated with the control member for deenergizing said electrically operated means after a rise in the space temperature and means associated with the control member for opening the energizing circuit of said motor upon a further rise in the space temperature.

ARTHUR C. GRANT.